United States Patent [19]

Bailey et al.

[11] Patent Number: 5,714,104
[45] Date of Patent: Feb. 3, 1998

[54] METHOD OF MOLDING FRP PARTS

[75] Inventors: Francis V. Bailey, Racine, Wis.; David K. Christensen, Winthrop Harbor, Ill.; Russell J. VanRens, Milwaukee, Wis.

[73] Assignee: Outboard Marine Corporation, Waukegan, Ill.

[21] Appl. No.: 489,363

[22] Filed: Jun. 12, 1995

[51] Int. Cl.$^6$ ............................ B28B 7/22; B28B 7/26
[52] U.S. Cl. ............... 264/254; 264/255; 264/257; 264/259; 264/260; 264/271.1
[58] Field of Search ........................ 264/254, 255, 264/259, 510, 260, 257, 271.1

[56] References Cited

U.S. PATENT DOCUMENTS

| | | | |
|---|---|---|---|
| 2,847,712 | 8/1958 | Pollard et al. | 18/55 |
| 2,962,764 | 12/1960 | Trojanowski et al. | 18/55 |
| 3,249,345 | 5/1966 | Gast | 261/39 |
| 3,305,618 | 2/1967 | Sucher et al. | 264/319 |
| 3,449,482 | 6/1969 | Mitchell et al. | 264/108 |
| 3,706,444 | 12/1972 | Masaki et al. | 261/39 |
| 3,780,718 | 12/1973 | Nambu et al. | 123/179 |
| 3,817,806 | 6/1974 | Anderson et al. | 264/511 |
| 3,903,343 | 9/1975 | Pfaff | 428/163 |
| 3,955,266 | 5/1976 | Honami et al. | 264/511 |
| 4,030,953 | 6/1977 | Rutschow et al. | 156/79 |
| 4,051,290 | 9/1977 | Jutte et al. | 428/168 |
| 4,069,802 | 1/1978 | Ross | 123/179 |
| 4,081,578 | 3/1978 | van Essen et al. | 428/63 |
| 4,123,488 | 10/1978 | Lawson | 264/135 |
| 4,385,955 | 5/1983 | Doerfling et al. | 156/245 |
| 4,409,270 | 10/1983 | Faber et al. | 428/63 |
| 4,442,055 | 4/1984 | Oelsch et al. | 264/105 |
| 4,485,065 | 11/1984 | Hatakeyama et al. | 264/255 |
| 4,573,258 | 3/1986 | Io et al. | 29/596 |
| 4,732,724 | 3/1988 | Sterner | 264/251 |
| 4,743,422 | 5/1988 | Kalriis-Nielsen et al. | 264/255 |
| 4,891,176 | 1/1990 | Drysdale et al. | 264/250 |
| 4,983,247 | 1/1991 | Kim | 156/272.2 |
| 5,034,076 | 7/1991 | Masui et al. | 156/79 |
| 5,043,114 | 8/1991 | Saito et al. | 264/46.6 |
| 5,089,206 | 2/1992 | Kia | 264/255 |
| 5,204,042 | 4/1993 | James et al. | 264/257 |
| 5,225,135 | 7/1993 | Kia | 264/255 |
| 5,356,588 | 10/1994 | Hara et al. | 264/257 |
| 5,413,661 | 5/1995 | Spengler et al. | 156/515 |

FOREIGN PATENT DOCUMENTS

| | | | |
|---|---|---|---|
| 1 532 732 | 11/1978 | France . | |
| 0018319 | 1/1985 | Japan | 264/257 |
| 1043522 | 3/1986 | Japan | 264/257 |
| 3087206 | 4/1988 | Japan | 264/257 |

*Primary Examiner*—Jan H. Silbaugh
*Assistant Examiner*—Robin S. Gray
*Attorney, Agent, or Firm*—Jones, Day, Reavis & Pogue

[57] ABSTRACT

A method of molding an integrated structure, the method comprising the steps of (a) using at least first and second mold parts to define a primary mold cavity, (b) placing first molding material in the primary mold cavity to form a primary structure, (c) removing the second mold part from the first mold part, (d) using the first mold part and at least a third mold part to define a secondary mold cavity partially filled by the primary structure, and (e) placing second molding material in the remainder of the secondary mold cavity to form the integrated structure including the primary structure and the second molding material.

12 Claims, 3 Drawing Sheets

METHOD OF MOLDING FRP PARTS

BACKGROUND OF THE INVENTION

The invention relates to the molding of fiber-reinforced plastic or fiber-reinforced polymer (FRP) parts. More particularly, the invention relates to such parts requiring both a cosmetic surface and structural features.

It can be difficult to mold a part with a cosmetic surface and structural features, such as a boat hull with integral stringers. Reinforcement loading problems and shrink and read-through can occur, especially with low pressure molding techniques.

Resin transfer molding (RTM) is best suited to parts having a constant wall thickness. In resin transfer molding, resin is injected or transferred at low pressure (which allows using relatively inexpensive tooling) into a mold cavity containing fiber reinforcement. The loading of the fiber reinforcement presents a limitation for RTM in that it is difficult to load loose bundles or strands of glass or other reinforcement material to form structural features such as ribs and bosses and have the reinforcement material stay in position while the tool is closed and prepared for injection. The reinforcement for RTM is generally a mat of fibrous material that is most suitable for molding parts having a constant wall thickness.

Bulk molding compound (BMC) includes short reinforcement strands of fiber mixed in resin in bulk quantities. This solves the fiber loading problem of RTM. BMC insures that the glass is wetted out, which allows forming structural features that are not resin rich. BMC requires the use of relatively expensive matched metal tools to accommodate the high pressures required to get the material to flow and fill the mold cavity.

SUMMARY OF THE INVENTION

The invention provides a method using multiple mold parts mated with one or more mating mold parts in order to build up, in progression, a composite FRP part. For example, a first mold part is formed to produce ribs, bosses or other structural features and is mated to a second mold part that limits the mold volume to these features. The mold is cycled to produce the FRP structural features, and the second mold part is removed, leaving the FRP structural features in the first mold part. The first mold part containing the FRP structural features is then mated to a third mold part formed to produce a wall with a relatively constant thickness and with a good cosmetic finish. This mold set (the first and third mold parts) is cycled to produce a cosmetic skin attached to the structural features formed in the first mold part.

This progression of mold mating avoids the above-mentioned problems associated with low pressure molding. Structural components are molded separately from the skin portion in order to keep shrink in the structural features from reading through the skin and to limit the amount of reinforcement that has to be loaded and maintained in position at any time.

The progression of molding can proceed from the structural features to the skin, as described above, or from the skin to the structural features. The progression can also include more than two steps to accommodate different materials and inserts. The molding processes for any part of the progression can include any FRP processes.

A variation of the foregoing includes molding mat (such as continuous strand mat) into the structural components such that the perimeter of the mat is not wetted during the molding of the structural portion. The portion of the mat in contact with the structural portion is wetted and becomes an integral part of the structure. The remainder of the mat is wetted by the resin in a subsequent step of the progression molding. This strengthens the bond between the two portions by having continuous fibers connecting them.

The invention also provides a method using two existing molding techniques in order to build up a composite FRP part. One molding material, such as BMC or sheet molding compound (SMC), is deposited in the portions of the mold cavity forming structural features such as ribs and bosses. Resin transfer molding is used to fill the remainder of the mold cavity. The exotherm from the RTM facilitates curing of the BMC or SMC. Some of the BMC reinforcement strands will intermingle with the RTM reinforcement. This method allows the manufacture of FRP parts having a good cosmetic surface and structural features while using low cost tooling. Limiting relative motion and pressure of the BMC in the mold allows use of aluminum, sprayed metal or composite tooling.

Other features and advantages of the invention will become apparent to those skilled in the art upon review of the following detailed description, claims and drawings.

Figure 1:
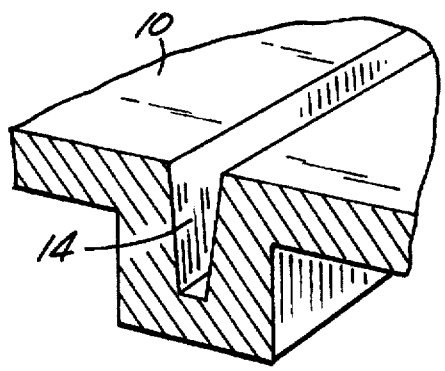
FIG. 1 is a partial perspective view of a first mold part used in a method according to the invention.

Before one embodiment of the invention is explained in detail, it is to be understood that the invention is not limited in its application to the details of the construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DESCRIPTION OF THE PREFERRED EMBODIMENT

One method in accordance with the invention is illustrated in FIGS. 1 through 6. Illustrated in FIG. 1 is a first or lower mold part 10 partially defining a primary mold cavity 14 having the shape of a rib or similar structural feature. The structural feature can be, for example, a stringer of a boat hull.

Figure 2:
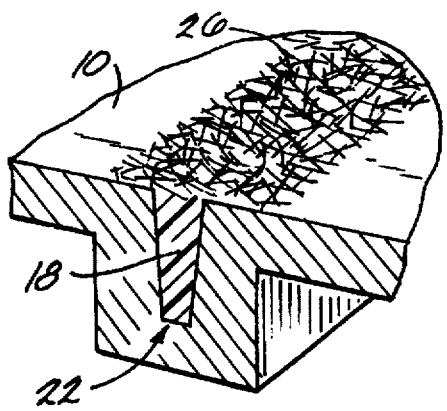
FIG. 2 is a view similar to FIG. 1 showing a first molding material and fibers in the first mold part.
Figure 3:
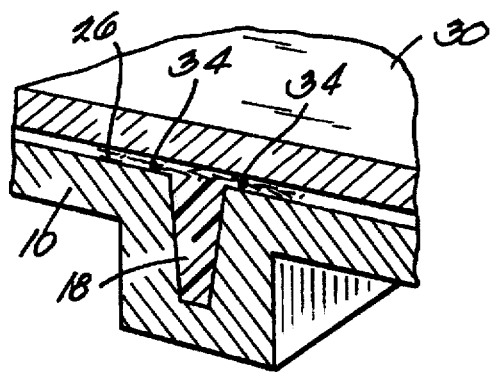
FIG. 3 is a view similar to FIG. 2 showing a second mold part mated with the first part.
Figure 4:
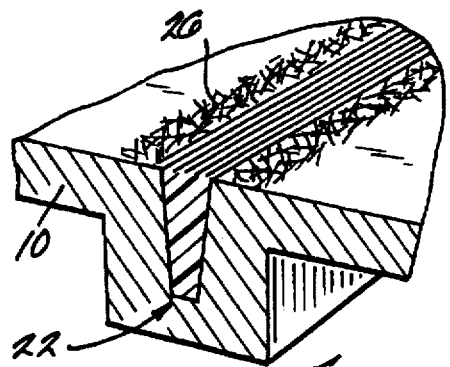
FIG. 4 is a view similar to FIG. 3 showing the second mold part removed and showing the fibers partially embedded in the first molding material.

As shown in FIG. 2, a first molding material 18, such as bulk molding compound, is placed in and fills the first mold part 10 to form a primary structure 22. Fibrous material 26, such as a section of continuous strand mat, is placed over the molding material 18. Next, as shown in FIG. 3, a second or upper mold part 30 is mated with the first mold part 10. A seal or seals 34 between the mold parts cooperate with the mold parts to fully define the primary mold cavity 14. It should be noted that more than two mold parts can be used to form the primary mold cavity 14. The fibrous material 26 extends beyond the seals 34 and outside of the primary mold cavity 14 such that a first or central portion of the fibrous material 26 becomes embedded in the primary structure 22 formed in the primary mold cavity 14, while a second or outer portion of the fibrous material 26 extends outside the primary mold cavity 14 and is not embedded in the primary structure 22. This is illustrated in FIG. 4, in which the second mold part 30 is removed from the first mold part 10 while the primary structure 22 remains positioned relative to the first mold part 10.

Figure 5:
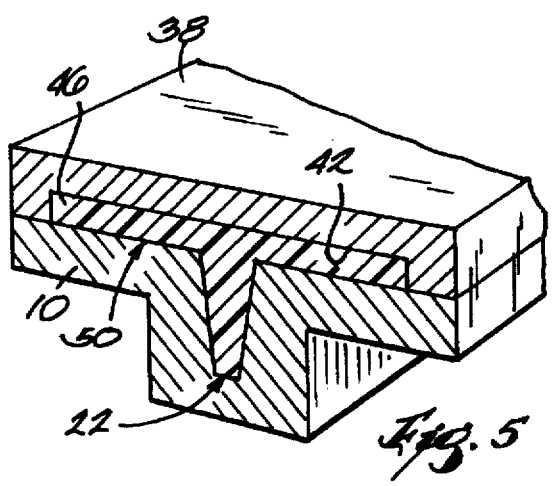
FIG. 5 is a view similar to FIG. 4 showing a third mold part mating with the first mold part and showing a second molding material in the mold cavity defined by the first and third mold parts.
Figure 6:
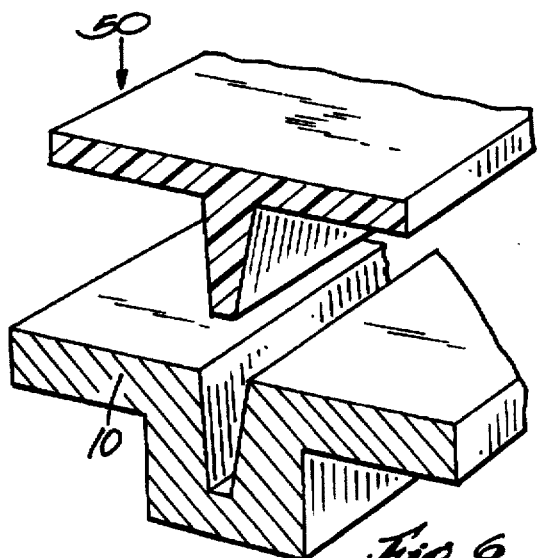
FIG. 6 is a view similar to FIG. 5 showing the third mold part removed and showing the final molded part being removed from the first part.

Next, as shown in FIG. 5, a third mold part 38 is placed over the first mold part 10 to define a secondary mold cavity 42 partially filled by the primary structure 22. It should be noted that more than two mold parts can be used to define the secondary mold cavity 42. The secondary mold cavity 42 has the shape of a wall, such as a portion of a boat hull, requiring a cosmetic surface as is known in the art. A second molding material 46 is then placed in and fills the remainder of the secondary mold cavity 42 to form an integrated structure 50 including the primary structure 22 and the second molding material 46. The second molding material 46 can be, for example, resin introduced into the mold in a resin transfer molding process. Alternatively, the first and second molding materials can be identical. The portion of the fibrous material 26 not embedded in the primary structure 22 becomes embedded in the second molding material 46 and in the integrated structure so that the first and second molding materials have a stronger bond.

Figure 7:
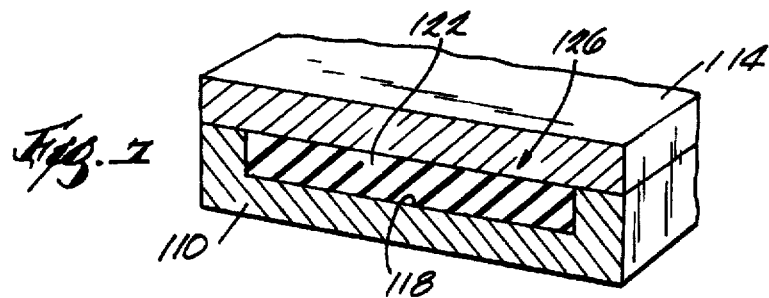
FIGS. 7 through 10 are views similar to FIGS. 1 through 6 illustrating an alternative method in accordance with the invention.
Figure 8:
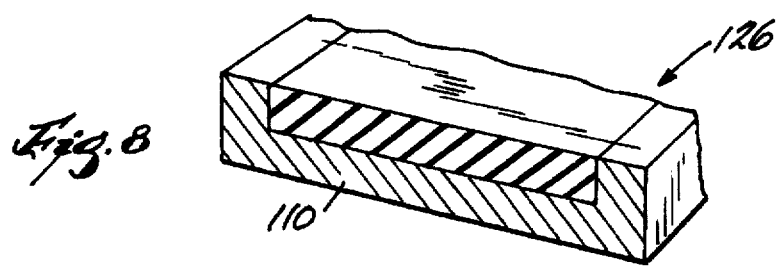

Another method in accordance with the invention is illustrated in FIGS. 7 through 10. Illustrated in FIG. 7 are a first or lower mold part 110 and a second or upper mold part 114. The mold parts define a primary mold cavity 118 having the shape of a wall. As also shown in FIG. 7, a first molding material 122, such as resin, is placed in (such as by resin transfer molding) and fills the primary mold cavity 118 to form a primary structure 126. Next, as shown in FIG. 8, the upper mold part 114 is removed from the lower mold part 110 while the primary structure 126 remains positioned relative to the lower mold part 110.

Figure 9:
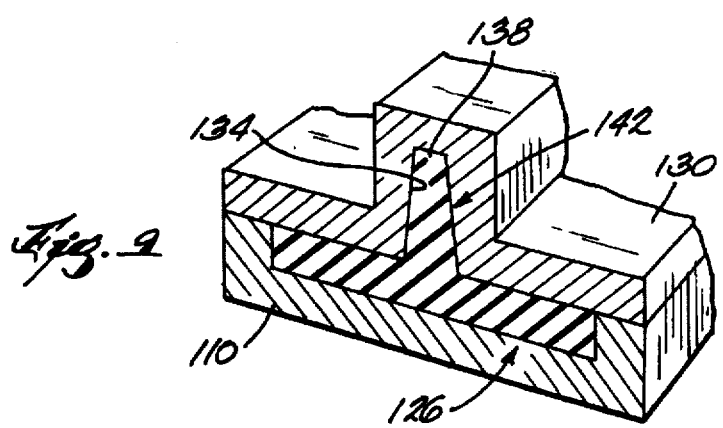

As shown in FIG. 9, a third mold part 130 is then placed over the lower mold part 110 to define a secondary mold cavity 134 partially filled by the primary structure 126. The secondary mold cavity 134 has the shape of the primary structure (a wall) along with a structural feature, in this case a rib. A second molding material 138, such as bulk molding compound, is placed in and fills the remainder of the secondary mold cavity 134 to form an integrated structure 142 including the primary structure 126 and the second molding material 138.

Figure 10:
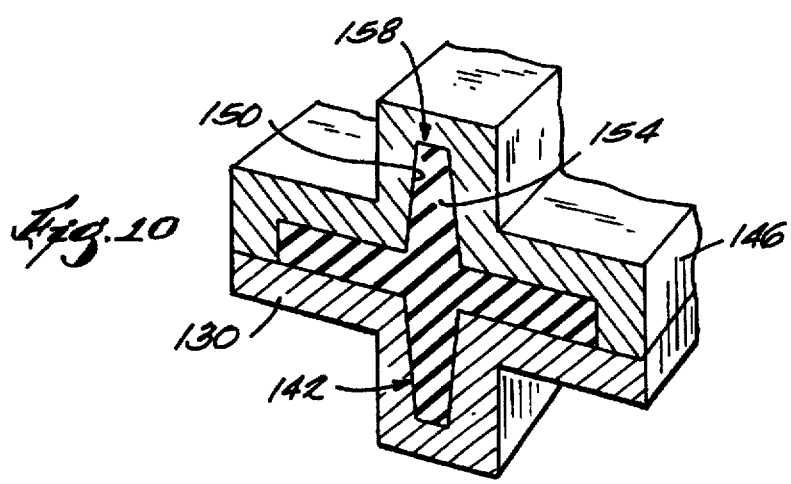
Figure 11:
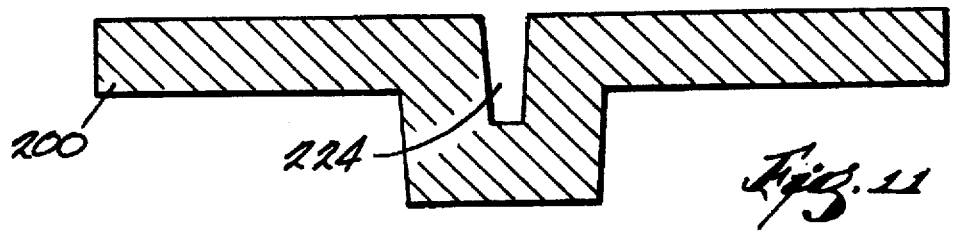
FIG. 11 is a sectional view of a lower mold part used in another alternative method according to the invention.

Next, as shown in FIG. 10, the third mold part 130 is inverted, the first mold part 110 is removed while the integrated structure 142 remains positioned relative to the third mold part 130, and a fourth mold part 146 is placed over the inverted third mold part 130 to define an additional mold cavity 150 partially filled by the integrated structure 142. The additional mold cavity 150 has the shape of the integrated structure (a wall and a rib) along with an additional rib. A third molding material 154, such as bulk molding compound, is placed in and fills the remainder of the additional mold cavity 150 to form an additional structure 158 including the integrated structure 142 and the third molding material 154.

For all of the foregoing, the molding techniques for any part of the progression can include any FRP processes, including but not limited to: resin transfer molding; sheet molding compound; bulk molding compound; reaction injection molding (RIM); structural reaction injection molding (SRIM); reinforced reaction injection molding (RRIM); and compression molding.

FIGS. 11 through 14 illustrate still another method in accordance with the invention. A lower mold part 200 mates with an upper mold part 204 (shown in FIGS. 13 and 14) to define a mold cavity 208 (see FIG. 13). The mold cavity 208 has the shape of the part 212 (see FIG. 14) to be molded. The final part 212 includes a wall portion 216 having a cosmetic surface and having a substantially constant thickness, and a structural feature, such as a rib 220, having a thickness substantially greater than the thickness of the wall portion 216. In the illustrated construction, the rib 220 has a thickness more than twice the thickness of the wall portion 216.

Figure 12:
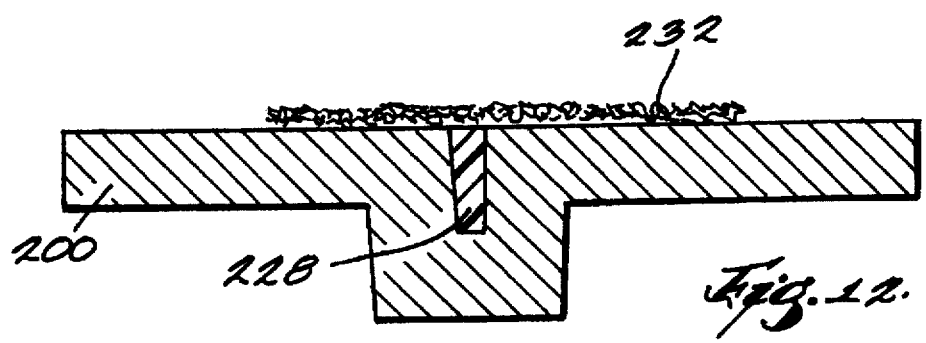
FIG. 12 is a view similar to FIG. 11 showing a later stage of the method.
Figure 13:
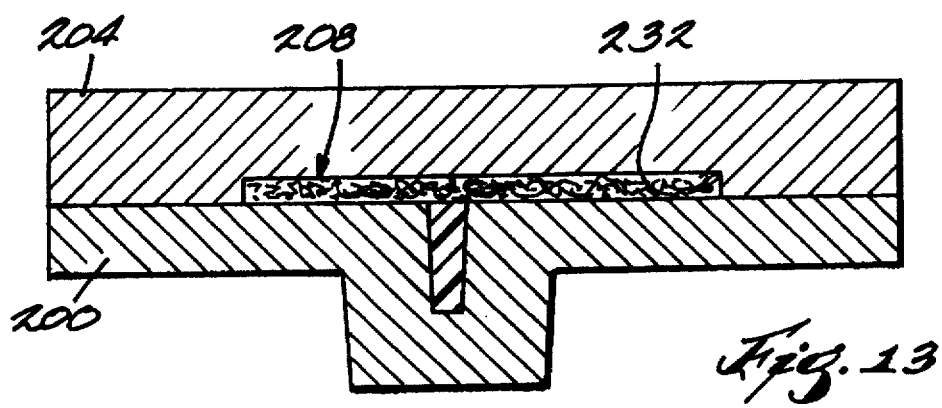
FIG. 13 is a view similar to FIG. 12 showing an upper molding mating with the lower mold part.
Figure 14:
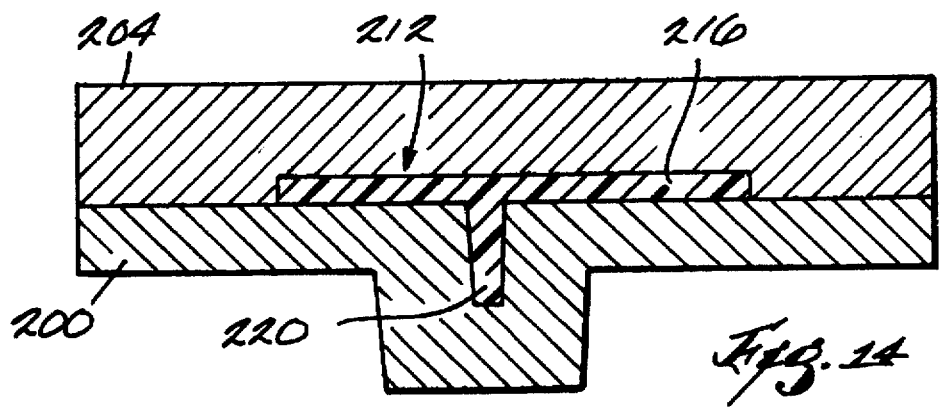
FIG. 14 is a view similar to FIG. 13 showing the mold cavity filled.

The lower mold part 200 includes (see FIG. 11) a recess 224 which forms the rib 220 of the part 212 to be molded. As shown in FIG. 12, the recess 224 is filled with a first molding material 228 that is dispensed either manually or automatically. The molding material 228, which is preferably bulk molding compound (alternatively sheet molding compound), does not have to be under pressure. In other words, the BMC 228 can be dispensed into the mold part 200 at ambient pressure. Conventional fiber reinforcement 232, such as continuous strand mat, is then laid over the recess 224 so that, when the upper mold part 204 is mated with the lower mold part 200, as shown in FIG. 13, the fiber reinforcement 232 substantially fills the remainder of the mold cavity 208, which forms the wall portion 216 of the part 212 to be molded. Some of the BMC reinforcement strands will intermingle with the fiber reinforcement 232. Resin is injected into or otherwise transferred into the remainder of the mold cavity 208 to fill the mold cavity. The resin is then cured. The exotherm from the RTM facilitates curing or cross linking of the BMC. The result (see FIG. 14) is the composite or integrated FRP part 212 with the wall portion 216 made by resin transfer molding, and with the rib 220 made of bulk molding compound or sheet molding compound.

This method allows the manufacture of FRP parts having a good cosmetic surface and structural features while using low cost tooling. Aluminum, sprayed metal or composite tooling can be used because the pressure of the BMC is limited.

Various features of the invention are set forth in the following claims.

We claim:

1. A method of molding a structure, said method comprising the steps of:
   (a) using a first mold part and a second mold part to define a primary mold cavity,
   (b) placing a first molding material in the primary mold cavity to form a primary structure, (c) placing a fibrous material in the primary mold cavity such that a first portion of the fibrous material is disposed within the primary mold cavity and such that a second portion of the fibrous material extends outside of the primary mold cavity, (d) placing a seal between the first mold part and the second mold part and between the first portion of said fibrous material and the second portion of said fibrous material to further define the primary mold cavity and to prevent the second portion of said fibrous material from becoming embedded in both the first molding material and the primary structure, (e) removing the second mold part from the first mold part, (f) using the first mold part and a third mold part to define an unfilled portion of a secondary mold cavity which is partially filled by the primary structure, (g) placing a second molding material in the unfilled portion of the secondary mold cavity to form an integrated structure which includes the primary structure and the second molding material, the second portion of said fibrous material being disposed within the secondary mold cavity and becoming embedded in the integrated structure, (h) removing the first mold part or the third mold part to leave a remaining mold part, (i) using the remaining mold part with a fourth mold part to define an unfilled portion of an additional mold cavity partially filled by the integrated structure, and (j) placing a third molding material in the unfilled portion of the additional mold cavity to form an additional structure including the integrated structure and the third molding material.

2. The method as set forth in claim 1 wherein the primary structure remains positioned relative to the first mold part during step (e).

3. The method as set forth in claim 1 wherein the primary mold cavity is smaller than the secondary mold cavity and is substantially filled by the primary structure.

4. The method as set forth in claim 3 wherein the secondary mold cavity is substantially filled by the integrated structure.

5. The method as set forth in claim 1 wherein the first molding material and the second molding material are identical.

6. The method as set forth in claim 1 wherein step (h) includes removing the third mold part from the first mold part while the integrated structure remains positioned relative to the first mold part.

7. The method as set forth in claim 6 wherein the primary structure remains positioned relative to the first mold part during step (e).

8. A method of molding an integrated structure, said method comprising the steps of:

(a) using a first mold part and a second mold part to define a primary mold cavity, (b) placing a first molding material in the primary mold cavity to form a primary structure positioned relative to the first mold part and the second mold part, (c) placing a fibrous material in the primary mold cavity such that a first portion of the fibrous material becomes embedded in the primary structure, and such that a second portion of the fibrous material extends outside of the primary mold cavity and is not embedded in the primary structure, (d) placing a seal between the first mold part and the second mold part and between the first portion of the fibrous material and the second portion of the fibrous material to further define the primary mold cavity and to prevent the second portion of the fibrous material from becoming embedded in both the first molding material and the primary structure, (e) removing the second mold part from the first mold part while the primary structure remains positioned relative to the first mold part, (f) using the first mold part and a third mold part different from the second mold part to define a secondary mold cavity, the secondary mold cavity including a first portion occupied by the primary structure and the first portion of the fibrous material and a remaining portion unoccupied by the primary structure and containing the second portion of the fibrous material, and (g) placing a second molding material in the remaining portion of the secondary mold cavity to form the integrated structure which includes the primary structure and the second molding material, said second portion of the fibrous material being embedded within said second molding material.

9. The method as set forth in claim 8 wherein the first molding material is a bulk molding compound.

10. The method as set forth in claim 9 wherein step (g) includes resin transfer molding.

11. The method as set forth in claim 8 wherein the primary mold cavity is smaller than the secondary mold cavity and is substantially filled by the primary structure.

12. The method as set forth in claim 11 wherein the secondary mold cavity is substantially filled by the integrated structure.

\* \* \* \* \*